(12) United States Patent  
Winslow (10) Patent No.: US 7,978,368 B2  
(45) Date of Patent: Jul. 12, 2011

(54) SYSTEM AND METHOD FOR VISUALIZATION OF BLACK-COMPONENT GAMUT SCULPTING

(75) Inventor: Bradley S. Winslow, Salem, NH (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 533 days.

(21) Appl. No.: 12/113,611

(22) Filed: May 1, 2008

(65) Prior Publication Data

US 2009/0273797 A1   Nov. 5, 2009

(51) Int. Cl.  
*H04N 1/60* (2006.01)

(52) U.S. Cl. ........ 358/1.9; 358/3.23; 358/515; 358/518; 358/529

(58) Field of Classification Search .................... 358/1.9, 358/2.1, 3.23, 504, 515, 518, 529; 382/162, 382/167  
See application file for complete search history.

(56) References Cited

U.S. PATENT DOCUMENTS

| | | | | |
|---|---|---|---|---|
| 6,313,925 B1 * | 11/2001 | Decker et al. | ................. | 358/1.9 |
| 6,833,937 B1 * | 12/2004 | Cholewo | ...................... | 358/518 |
| 7,006,252 B2 * | 2/2006 | Gallagher et al. | ............ | 358/1.9 |
| 7,019,868 B2 * | 3/2006 | Chang et al. | .................. | 358/2.1 |
| 7,206,100 B2 * | 4/2007 | Namikata | .................... | 358/3.23 |
| 7,304,767 B2 * | 12/2007 | Sasaki et al. | .................. | 358/1.9 |
| 7,768,682 B2 * | 8/2010 | Mestha et al. | ............... | 358/518 |
| 2002/0113982 A1 * | 8/2002 | Chang et al. | .................. | 358/1.9 |
| 2005/0219561 A1 * | 10/2005 | Haikin | ......................... | 358/1.9 |
| 2006/0017955 A1 * | 1/2006 | Owen et al. | ................. | 358/1.13 |
| 2006/0197998 A1 * | 9/2006 | Shibuya et al. | .............. | 358/518 |
| 2007/0121136 A1 * | 5/2007 | Gotoh et al. | .................. | 358/1.9 |
| 2009/0290172 A1 * | 11/2009 | Boll | .............................. | 358/1.9 |

* cited by examiner

*Primary Examiner* — Kimberly A Williams  
(74) *Attorney, Agent, or Firm* — SoCal IP Law Group LLP; Steven C. Sereboff; Jonathan Pearce (57) ABSTRACT

The subject application is directed to a system and method for visualization of black-component gamut sculpting. Parameter data is first received corresponding to parameters associated with the black replacement for a primary color system. Alternative color profiles are then generated according to the parameter data and characteristics of the primary color system. Image data is then received of an image defined in the primary color system. Renderings are then generated corresponding to the received image data, with each rendering uniquely corresponding to one of the alternative color profiles. Selection data is then received corresponding to a selected black replacement parameter selected in accordance with the generation of the renderings.

14 Claims, 6 Drawing Sheets

SYSTEM AND METHOD FOR VISUALIZATION OF BLACK-COMPONENT GAMUT SCULPTING

BACKGROUND OF THE INVENTION

The subject application is directed generally to black replacement in connection with primary color schemes. The application is particularly suited to provide users with prompt feedback relative to black replacement under various black-width replacement strategies.

Color images are generated by selectively combining primary colors from a selected color space. There are two basic types of primary colors, additive and subtractive. Additive colors are typically used in active light generation devices, such as projectors or displays. A common additive color space for such devices is comprised of red, green, and blue (RGB), which can be selectively combined to generate most colors recognized by the human eye. A positive combination of all colors generates light that is perceived as white.

A subtractive color space is used to selectively remove colors from a composite light source, such as white light. Subtractive primaries are typically used to generate color images on passive material, such as paper. Inks or dyes from a subtractive color space, such as cyan, magenta, and yellow, may be selectively applied to a medium, such as paper, to generate color images. Current devices, such as workstations, typically include both active devices, such as a display, and passive devices, such as a printer. An electronic image is suitably viewed or manipulated on a display, and a printout is made on a color printer. It will be appreciated that to do such, an image must be represented in both active and passive color spaces.

The total amount of colors that can be realized by various primary colors is referred to as a gamut. A gamut of a CMY color space can be extended by the addition of a black colorant. Addition of black (K) results in a color space referred to as CMYK. Certain colors in CMYK color space can be realized with the CMY components, or alternatively realized by a substitution of black.

In color profiles, such as profiles formatted in connection with the International Color Consortium (ICC), a black generation method may be chosen at a time when a profile is created. It is often desirable to determine a black replacement strategy which is optimal for a particular image or a particular physical rendering device. A user suitably specifies a range for black replacement. This is suitably specified by specifying a start value, a maximum value, or a width for black replacement. A black start value is suitably thought of as an amount of black ink where black starts replacing other inks. A maximum value is suitably defined as to how high the black level is permitted to be for a resulting color. A black width is suitably defined as to how far into saturated colors black replacement is permitted. A low black width will, for example, limit black substitution to near-neutral colors, while a high black width will allow substitutions further into saturated colors.

An optimal black width setting needs to be determined for particular cases. If saturated colors appear to be muddy, this may be an indication that black width should be lowered. Given the complexity of generating visual feedback relative to various black width options, it is generally not practicable to give rapid feedback once adjustments are made.

SUMMARY OF THE INVENTION

In accordance with one embodiment of the subject application, there is provided a system and method for black replacement in connection with primary color schemes.

Further, in accordance with one embodiment of the subject application there is provided a system and method to provide users with prompt feedback relative to black replacement under various black-width replacement strategies.

Still further, in accordance with one embodiment of the subject application there is provided a system for visualization of black-component gamut sculpting. The system comprises means adapted for receiving parameter data corresponding to parameters associated with black replacement for an associated primary color system and means adapted for generating a plurality of alternative color profiles in accordance with characteristics of the associated primary color system and received parameter data. The system also comprises means adapted for receiving image data corresponding to an image defined in the primary color system and visual output means adapted for generating a plurality of renderings corresponding to received image data, each rendering uniquely corresponding to at least one of the alternative color profiles. The system further comprises means adapted for receiving selection data corresponding to a selected black replacement parameter selected in accordance with generation of the plurality of renderings.

Still further, in accordance with one embodiment of the subject application there is provided a method for visualization of black-component gamut sculpting. The method includes the step of receiving parameter data corresponding to parameters associated with the black replacement of a primary color system. The method also includes the step of generating alternative color profiles based upon characteristics of the primary color system and the parameter data. The method further comprises the step of receiving image data of an image defined in the primary color system and the step of generating renderings of the image data, with each rendering uniquely corresponding to one of the alternative color profiles. In addition, the method includes the step of receiving selection data of a selected black replacement parameter that is selected according to the generation of the renderings.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for black replacement in connection with primary color schemes. In particular, the subject application is directed to a system and method to provide users with prompt feedback relative to black replacement under various black-width replacement strategies. More particularly, the subject application is directed to a system and method for visualization of black-component gamut sculpting. It will become apparent to those skilled in the art that the system and method described herein are suitably adapted to a plurality of varying electronic fields employing color replacement, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
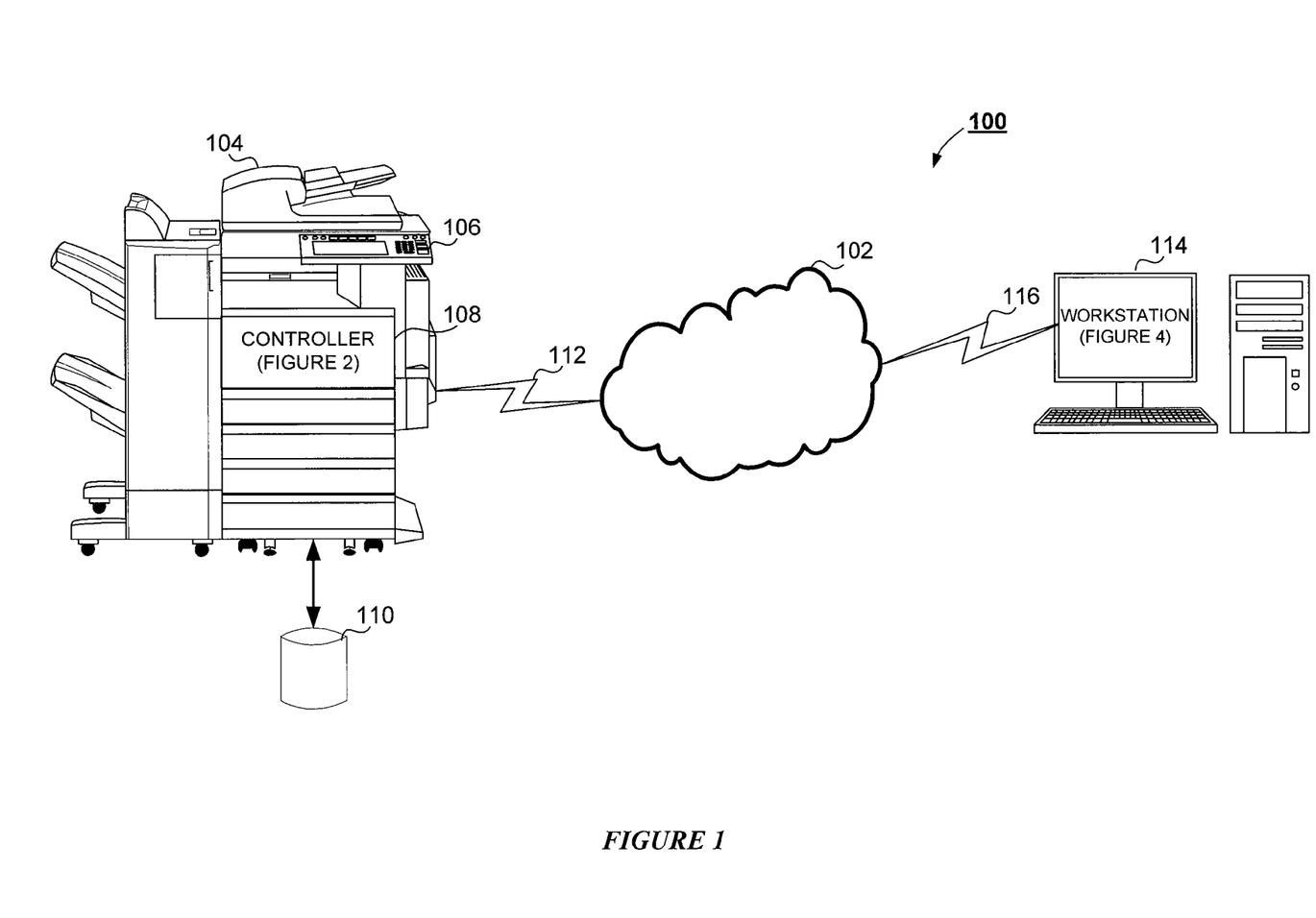
FIG. 1 is an overall diagram of a system for visualization of black-component gamut sculpting according to one embodiment of the subject application.

Referring now to FIG. 1, there is shown an overall diagram of a system 100 for visualization of black-component gamut sculpting in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for visualization of black-component gamut sculpting of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store document data, image data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like.

The system 100 illustrated in FIG. 1 further depicts a workstation 114, in data communication with the computer network 102 via a communications link 116. It will be appreciated by those skilled in the art that the workstation 114 is shown in FIG. 1 as a computer workstation for illustration purposes only. As will be understood by those skilled in the art, the workstation 114 is representative of any personal computing device known in the art, including, for example and without limitation, a laptop computer, a personal computer, a personal data assistant, a web-enabled cellular telephone, a smart phone, a proprietary network device, or other web-enabled electronic device. The communications link 116 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the workstation 114 is suitably adapted to receive and modify image data, perform color calculations and conversions, generate display data, generate output data, or the like, to the document processing device 104, or any other similar device coupled to the computer network 102. The functioning of the workstation will better be understood in conjunction with the block diagrams illustrated in FIG. 4, explained in greater detail below.

Figure 2:
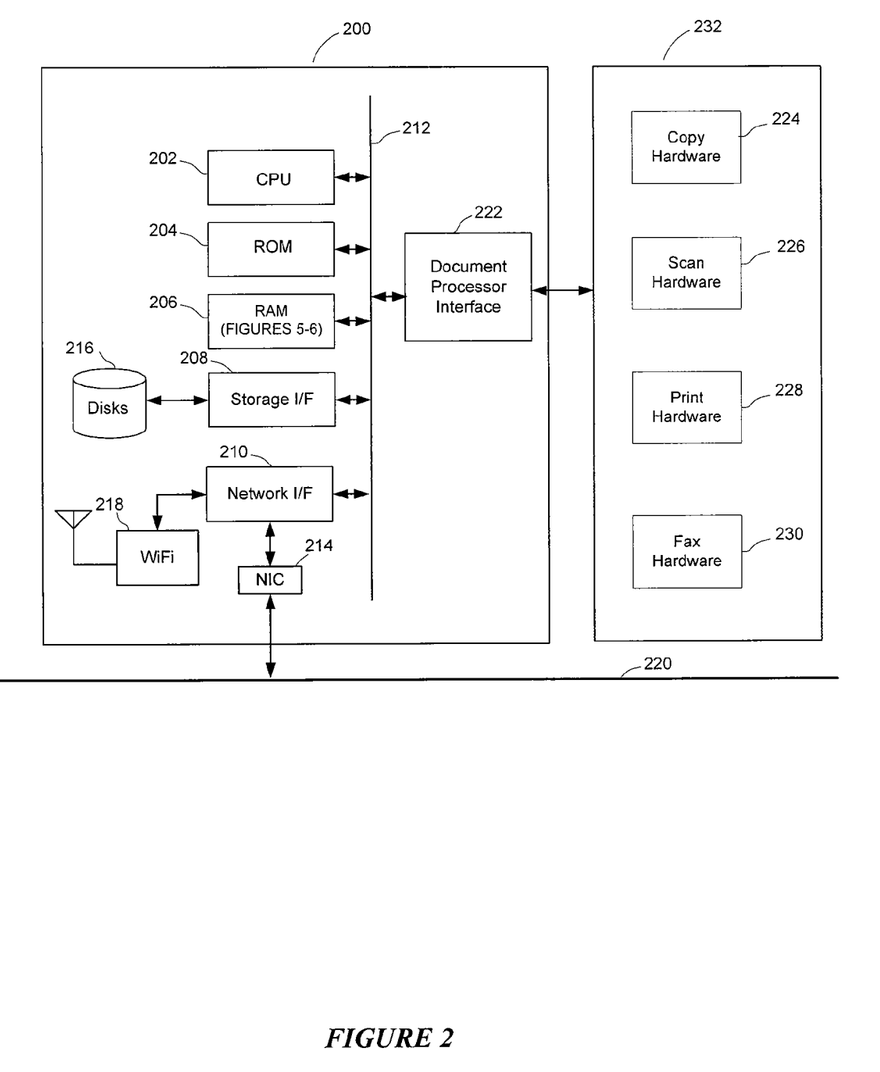
FIG. 2 is a block diagram illustrating controller hardware for use in the system for visualization of black-component gamut sculpting according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 200 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by the bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
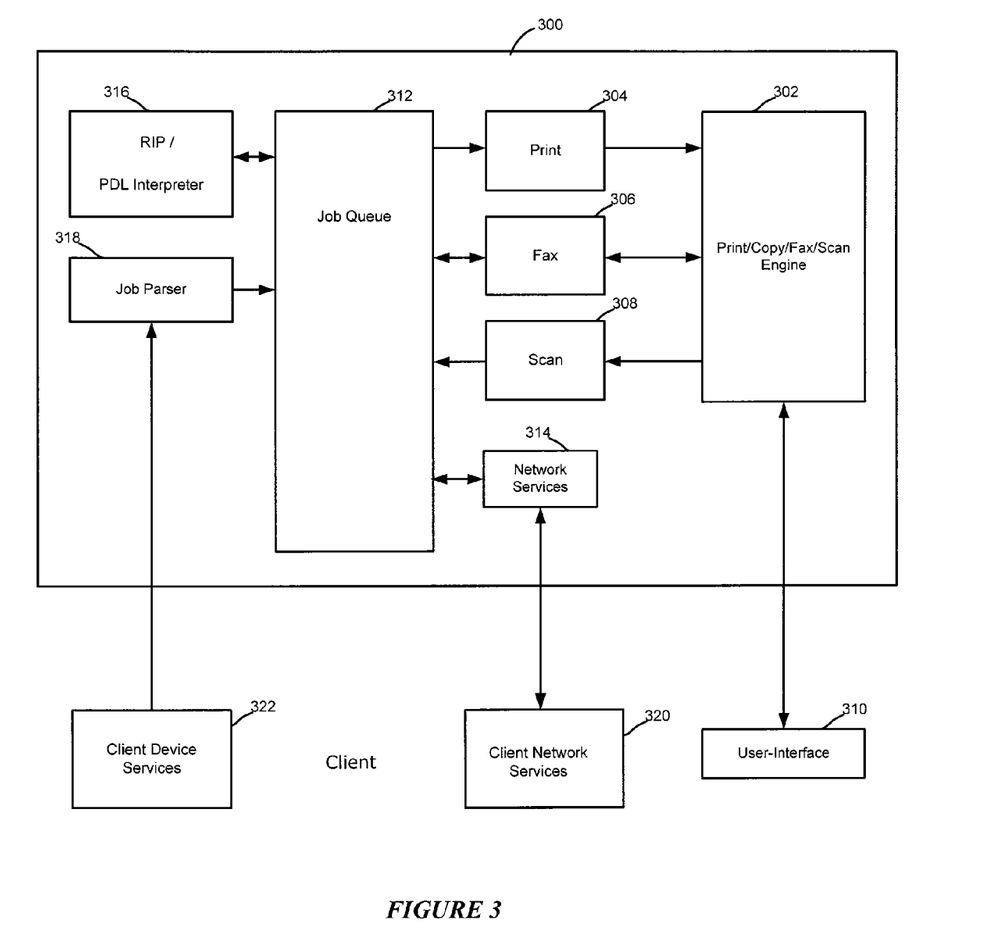
FIG. 3 is a functional diagram illustrating the controller for use in the system for visualization of black-component gamut sculpting according to one embodiment of the subject application.

Functionality of the subject system 100 is accomplished on a suitable document processing device, such as the document processing device 104, which includes the controller 200 of FIG. 2, (shown in FIG. 1 as the controller 108) as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The parser 318 functions to interpret a received electronic document file and relay it to the job queue 312 for handling in connection with the afore-described functionality and components.

Figure 4:
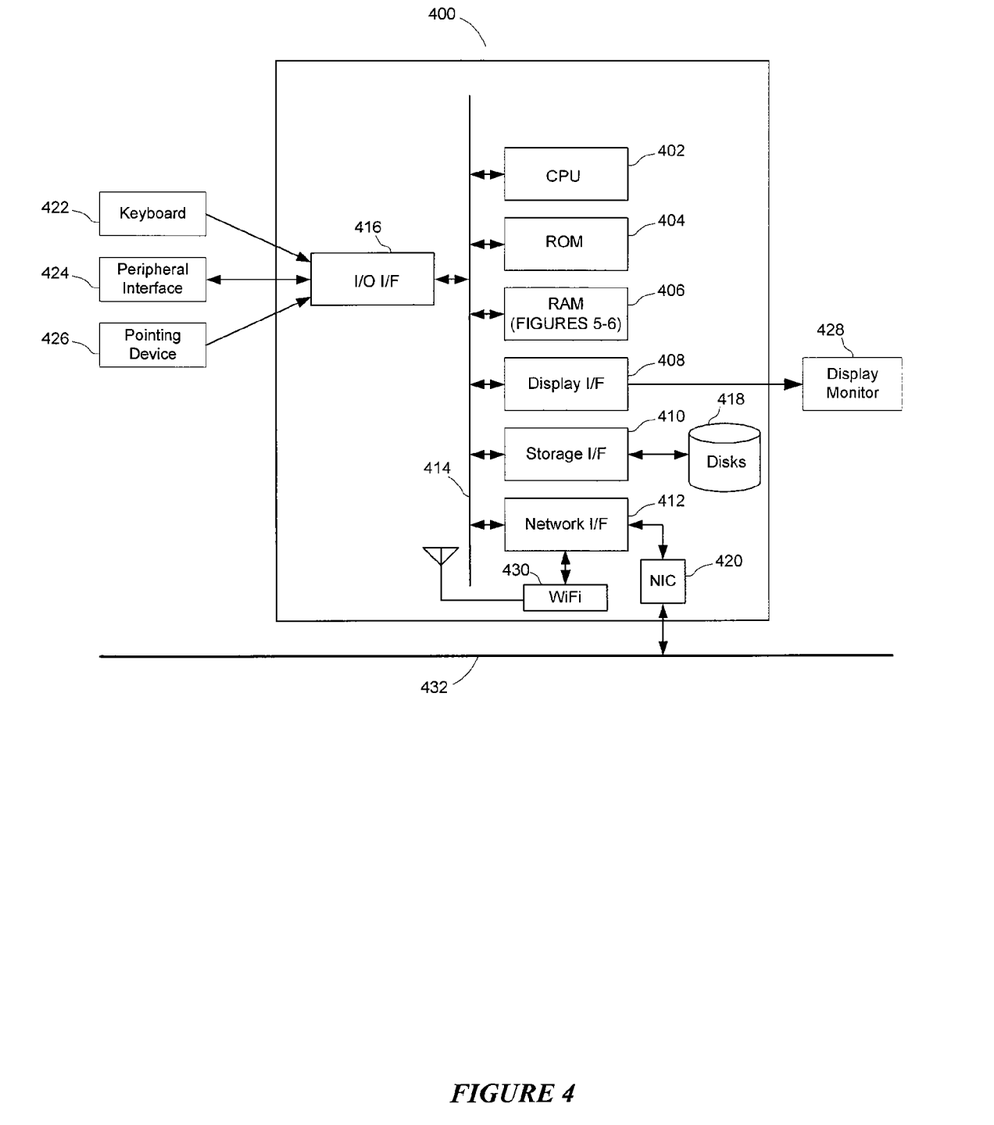
FIG. 4 is a diagram illustrating a workstation for use in the system for visualization of black-component gamut sculpting according to one embodiment of the subject application.

Turning now to FIG. 4, illustrated is a hardware diagram of a suitable workstation 400, shown in FIG. 1 as the workstation 114, for use in connection with the subject system. A suitable workstation includes a processor unit 402 which is advantageously placed in data communication with read only memory 404, suitably non-volatile read only memory, volatile read only memory or a combination thereof, random access memory 406, display interface 408, storage interface 410, and network interface 412. In a preferred embodiment, interface to the foregoing modules is suitably accomplished via a bus 414.

The read only memory 404 suitably includes firmware, such as static data or fixed instructions, such as BIOS, system functions, configuration data, and other routines used for operation of the workstation 400 via CPU 402.

The random access memory 406 provides a storage area for data and instructions associated with applications and data handling accomplished by the processor 402.

The display interface 408 receives data or instructions from other components on the bus 414, which data is specific to generating a display to facilitate a user interface. The display interface 408 suitably provides output to a display terminal 428, suitably a video display device such as a monitor, LCD, plasma, or any other suitable visual output device as will be appreciated by one of ordinary skill in the art.

The storage interface 410 suitably provides a mechanism for non-volatile, bulk or long term storage of data or instructions in the workstation 400. The storage interface 410 suitably uses a storage mechanism, such as storage 418, suitably comprised of a disk, tape, CD, DVD, or other relatively higher capacity addressable or serial storage medium.

The network interface 412 suitably communicates to at least one other network interface, shown as network interface 420, such as a network interface card, and wireless network interface 430, such as a WiFi wireless network card. It will be appreciated by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 420 is interconnected for data interchange via a physical network 432, suitably comprised of a local area network, wide area network, or a combination thereof.

An input/output interface 416 in data communication with the bus 414 is suitably connected with an input device 422, such as a keyboard or the like. The input/output interface 416 also suitably provides data output to a peripheral interface 424, such as a USB, universal serial bus output, SCSI, Firewire (IEEE 1394) output, or any other interface as may be appropriate for a selected application. Finally, the input/output interface 416 is suitably in data communication with a pointing device interface 426 for connection with devices, such as a mouse, light pen, touch screen, or the like.

In operation, parameter data is first received corresponding to parameters associated with the black replacement for an associated primary color system. A plurality of alternative color profiles are then generated according to characteristics of the primary color system and the parameter data. Image data is then received corresponding to an image that is defined in the primary color system. Multiple renderings are then generated corresponding to the received image data, with each rendering uniquely corresponding to at least one of the alternative color profiles. Selection data is then received corresponding to a selected black replacement parameter selected in accordance with the generation of the renderings.

In accordance with one example embodiment of the subject application, the workstation 114 generates a representative profile parameter set with a range of black-width values. It will be appreciated by those skilled in the art that while reference is made herein to the workstation 114, the controller 108 or other suitable component associated with the document processing device 104 is capable of being used in accordance with the subject example embodiment. The generated representative set is then input into suitable profile machinery, e.g. software and hardware components associated with the workstation 114 and suitably adapted to generate color profiles in accordance with the range of black-width values. A representative set of color profiles are thereby generated, e.g. alternate color profiles.

A source image, a source profile, and the set of color profiles are then input into a color matching module associated with the workstation 114 as will be understood by one skilled in the art. The color matching module thereafter outputs rendered images within the range of the received black-width values. The CMYK images are then decomposed by the workstation 114 so as to determine the color separations associated therewith. The rendered images and separations at the range of the received black-width values and the representative set of color profiles are then input into the color matching module, along with a RGB color profile, so as to generate a set of pre-computed images. The pre-computed images are then stored locally to the workstation 114 in association with one or more applications resident thereon.

Preferably, the foregoing operations are preformed by the workstation 114 prior to involvement of an associated user, i.e. prior to the user initiating an associated application that involves image processing. Image data is then received by the application, e.g. selected by the associated user, via interactions with the workstation 114. The user is then prompted to modify a black-width parameter associated with the received image data, e.g. via a suitable graphical user interface, dialog box, or the like. The set of pre-computed images previously stored are then retrieved by the workstation.

Interpolation of the pre-computed images and the separations is then performed so as to render image and separations for the selected black-width value. The interpolated image and separations are then displayed via the workstation 114 so as to provide the associated user with a visual clue as to the changes the selected black-width value would have on the originally received image. Preferably, the rendering of the interpolated image is accomplished via a suitable display associated with the workstation 114, as will be understood by those skilled in the art. The user then evaluates the visual clue so as to determine whether the selected black-width value is acceptable. If not acceptable, the user is prompted to select a new black-width value and the process repeats until such time as the user is satisfied with the adjusted black-width parameter. Thereafter, the user is able to output the image processed accordingly to the document processing device 104, save the image locally, etc., as will be appreciated by those skilled in the art.

In accordance with another example embodiment of the subject application, parameter data is received by the workstation 114, the controller 108, or other suitable component associated with the document processing device 104. For purposes of this example embodiment, reference is made hereinafter to the workstation 114, or components thereof, performing the processing described below. The skilled artisan will appreciate that the controller 108 or other suitable component associated with the document processing device 104, a device coupled to the computer network 102, or the like, is equally capable of functioning in accordance with this example embodiment. Preferably, the parameter data is associated with black replacement for a primary color system, e.g. CMY color systems.

The workstation 114 then generates alternative color profiles based upon the characteristics of the CMY primary color system and the received parameter data. The workstation 114 or a suitable component associated therewith then receives image data of an image defined in the CMY primary color system. Multiple renderings are then generated by the workstation 114 corresponding to the image data with each of the renderings uniquely corresponding to at least on one of the alternative color profiles. Selection data is then received, e.g. from an associated user via the workstation 114, corresponding to a selected black replacement parameter selected in accordance with the generated renderings. That is, an associated user selects a black replacement parameter based upon the generated renderings.

Color separations are then generated by the workstation 114, each of which corresponds to one of the multiple renderings. The workstation 114, or a suitable component associated therewith, then generates a set of pre-computed images in accordance with the renderings, the associated color separations, and the alternative color profiles. According to one embodiment of the subject application, the set of pre-computed images is generated in accordance with a received red, green, and blue color profile. Parameter adjustment data is then received from the associated user corresponding to a modification of the received parameter data. An interpolated image is then generated by the workstation 114 of the image data in accordance with the parameter adjustment data and the set of pre-computed images. A rendering is then generated corresponding to received image data based on the interpolation results. The user is then able to either accept the rendering, or further adjust the parameter data.

Figure 5:
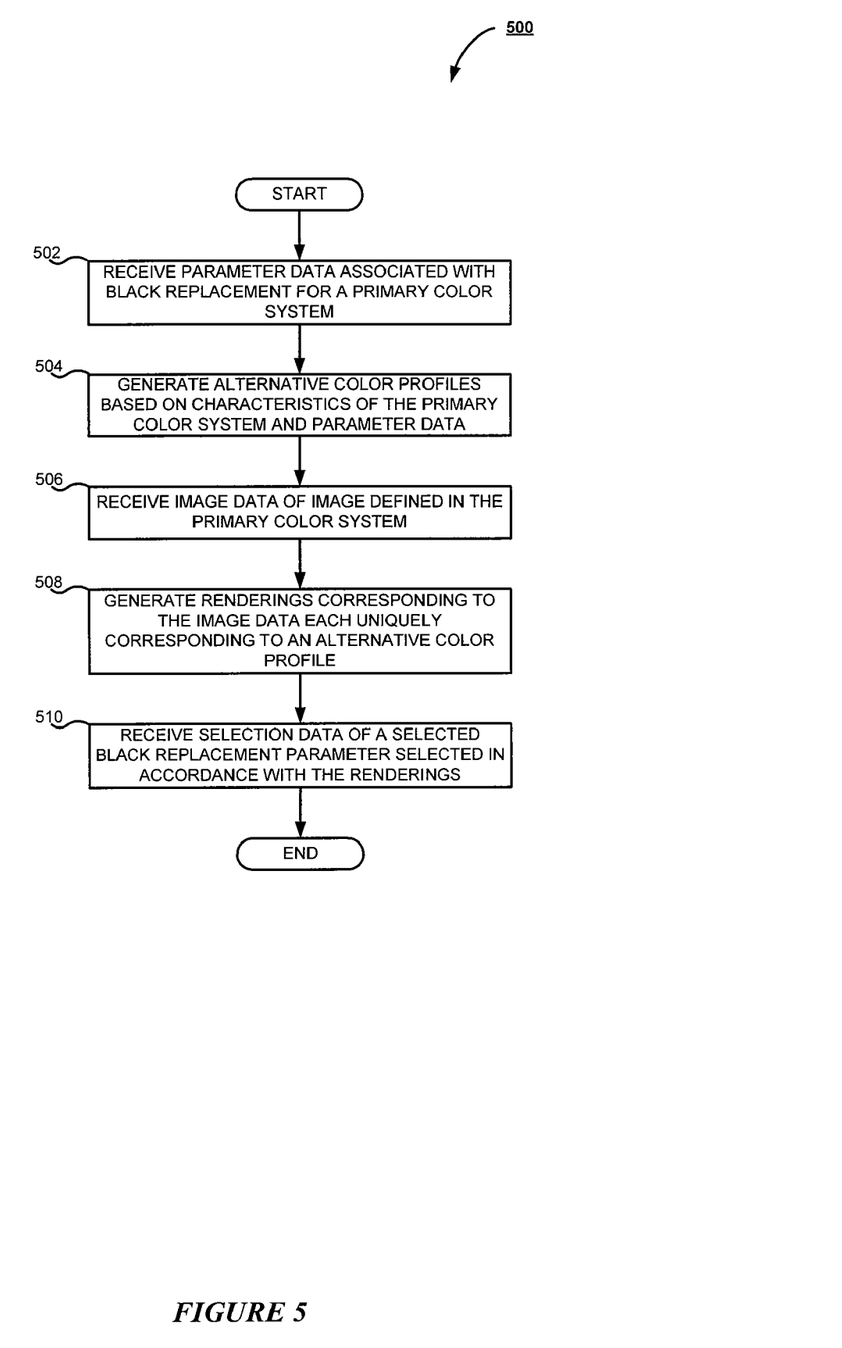
FIG. 5 is a flowchart illustrating a method for visualization of black-component gamut sculpting according to one embodiment of the subject application.

The skilled artisan will appreciate that the subject system 100 and components described above with respect to FIG. 1, FIG. 2, FIG. 3, and FIG. 4 will be better understood in conjunction with the methodologies described hereinafter with respect to FIG. 5 and FIG. 6. Turning now to FIG. 5, there is shown a flowchart 500 illustrating a method for visualization of black-component gamut sculpting in accordance with one example embodiment of the subject application. Beginning at step 502, parameter data is received corresponding to parameters associated with black replacement for an associated primary color system. It will be appreciated by those skilled in the art that the primary color system corresponds to any primary color system known in the art capable of instituting black replacement including, for example and without limitation, CMY, or the like. Those skilled in the art will appreciate that the parameter data includes, for example and without limitation, black-width, or the like. Reference is made with respect to FIG. 1 as the workstation 114 performing the operations illustrated in FIG. 5 for example purposes only, and the skilled artisan will appreciate that the controller 108 or other suitable component associated with the document processing device 104 is equally capable of performing such operations.

At step 504, alternative color profiles are generated based on characteristics of the primary color system and the received parameter data. That is, the workstation 114 or a suitable component associated therewith generates alternative color profiles based on the CMY color system and the black replacement parameter. It will be appreciated by those skilled in the art that the color profiles suitably correspond to the output capabilities of the display associated with the workstation 114, the document processing device 104, or other suitable active or passive devices. At step 506, image data corresponding to an image defined in the primary color system is received. Renderings are then generated at step 508 corresponding to the received image data, with each rendering uniquely corresponding to at least one of the alternative color profiles. Thereafter, at step 510, selection data is received corresponding to a selected black replacement parameter selected in accordance with the generation of the renderings.

Figure 6:
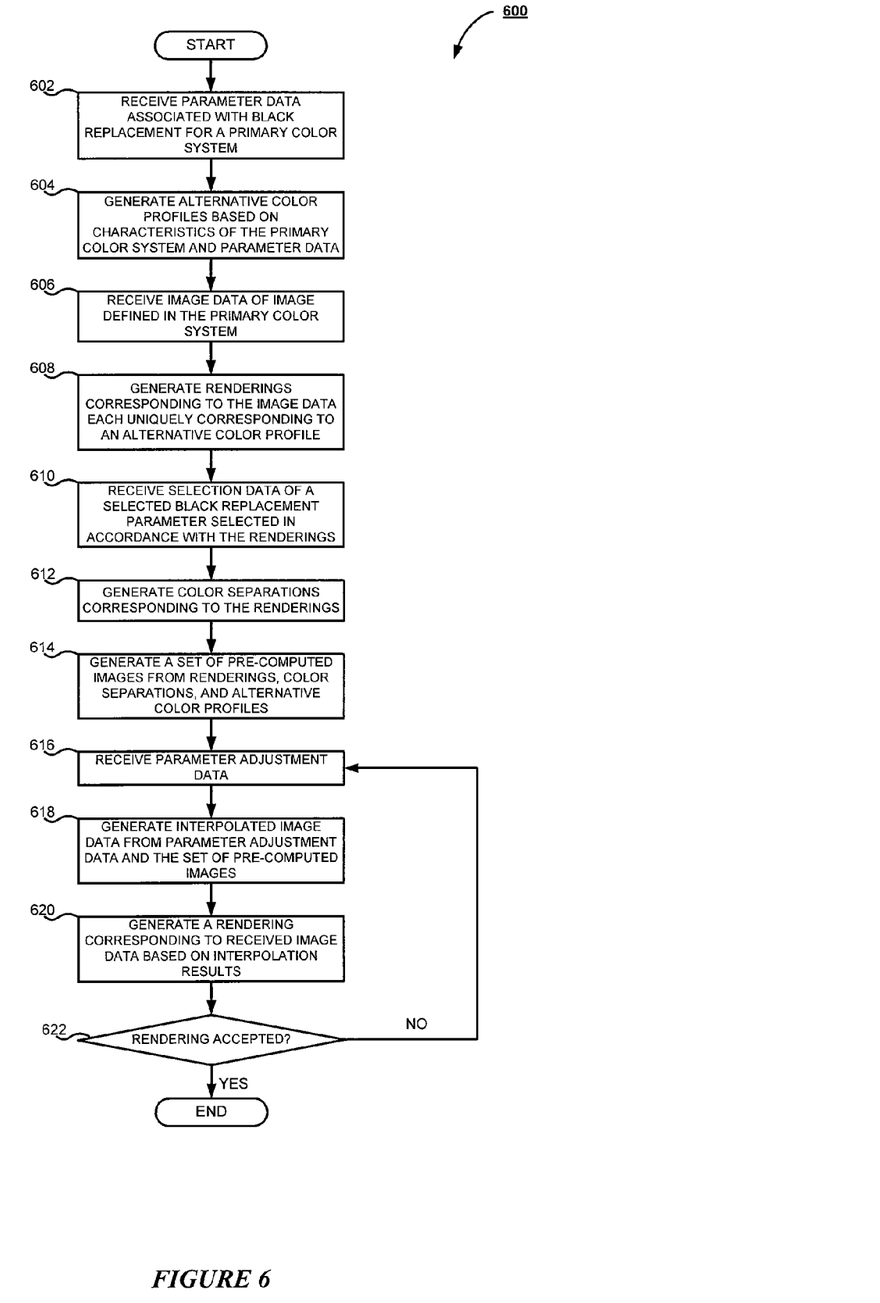
FIG. 6 is a flowchart illustrating a method for visualization of black-component gamut sculpting according to one embodiment of the subject application.

Referring now to FIG. 6, there is shown a flowchart 600 illustrating a method for visualization of black-component gamut sculpting in accordance with one example embodiment of the subject application. The method depicted in FIG. 6 begins at step 602, whereupon the workstation 114 or a component associated therewith receives parameter data associated with black replacement for a primary color system. At step 604, alternative color profiles based on characteristics of the primary color system and the received parameter data are generated by the workstation 114.

Image data is then received by the workstation 114 at step 606. Preferably, the image data is defined in the primary color system, as will be understood by those skilled in the art. At step 608, the workstation 114 or a suitable component associated therewith generates a plurality of renderings corresponding to the received image data, with each rendering uniquely corresponding to at least one of the alternative color profiles. Selection data is then received at step 610 corresponding to a selected black replacement parameter. In accordance with such an example embodiment, the black replacement parameter is selected according to the generation of the plurality of renderings.

A plurality of color separations are then generated by the workstation 114 or a suitable component thereof at step 612. Preferably, each color separation corresponds to one of the plurality of renderings, as will be understood by those skilled in the art. At step 614, a set of pre-computed images are generated in accordance with the renderings, the associated color separations, and the alternative color profiles. According to one embodiment of the subject application, the set of pre-computed images is generated in accordance with a received red, green, and blue color profile.

Parameter adjustment data is then received by the workstation or a suitable component associated therewith corresponding to a modification of the received parameter data at step 616. At step 618, interpolated image data is generated in accordance with the received parameter adjustment data and the set of pre-computed images. A rendering is then generated at step 620 corresponding to the received image data in accordance with the results of the interpolation. Preferably, such a rendering is displayed to an associated user via a display of the workstation 114, as will be understood by one skilled in the art. A determination is then made at step 622 whether the rendering so displayed is acceptable to the user. That is, whether the image rendered in accordance with the adjusted parameter data is acceptable to the user. Upon a negative determination at step 622, flow returns to step 616, whereupon the user inputs different parameter adjustment data. Operations continue from step 618 to step 622 until such time as the user accepts the rendering, whereupon the methodology described in FIG. 6 terminates.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for visualization of black-component gamut sculpting comprising:
   means for receiving parameter data corresponding to parameters associated with black replacement for an associated primary color system;
   means for generating a plurality of alternative color profiles in accordance with characteristics of the associated primary color system and received parameter data;
   means for receiving image data corresponding to an image defined in the primary color system;
   visual output means for generating a plurality of renderings corresponding to received image data on a computer display, each rendering uniquely corresponding to at least one of the alternative color profiles;
   means for receiving selection data corresponding to a selected black replacement parameter selected in accordance with generation of the plurality of renderings; and
   means for generating color separations corresponding to the plurality of renderings.

2. The system of claim 1 further comprising set generation means for generating a set of pre-computed images in accordance with the plurality of renderings and associated color separations, and further in accordance with the plurality of alternative color profiles.

3. The system of claim 2 further comprising:
   means for receiving parameter adjustment data corresponding to a modification of received parameter data;
   interpolation means for generating interpolated image data in accordance with received parameter adjustment data and the set of pre-computed images; and
   means for generating a rendering corresponding to received image data in accordance with an output of the interpolation means.

4. The system of claim 3 wherein the primary color system is defined as cyan, magenta, and yellow, and wherein the set generation means further includes means for generating the set of pre-computed images in accordance with a received red, green, and blue color profile.

5. The system of claim 3 wherein the plurality of renderings includes interpolated image data and associated color separation data.

6. The system of claim 3 wherein the interpolated image data is displayed to the user to aid in selecting the black replacement parameter.

7. The system of claim 2 wherein the set of pre-computed images are generated prior to any user interaction.

8. A method for visualization of black-component gamut sculpting comprising:
   receiving parameter data corresponding to parameters associated with black replacement for an associated primary color system;
   generating a plurality of alternative color profiles in accordance with characteristics of the associated primary color system and received parameter data;
   receiving image data corresponding to an image defined in the primary color system;
   generating a plurality of renderings corresponding to received image data on a computer display, each rendering uniquely corresponding to at least one of the alternative color profiles; and
   receiving selection data corresponding to a selected black replacement parameter selected in accordance with generation of the plurality of renderings; and
   generating color separations corresponding to the plurality of renderings.

9. The method of claim 8 further comprising generating a set of pre-computed images in accordance with the plurality of renderings and associated color separations, and further in accordance with the plurality of alternative color profiles.

10. The method of claim 9 further comprising:
    receiving parameter adjustment data corresponding to a modification of received parameter data;
    generating interpolated image data in accordance with received parameter adjustment data and the set of pre-computed images; and
    generating a rendering corresponding to received image data in accordance with the interpolation.

11. The method of claim 10 wherein the primary color system is defined as cyan, magenta, and yellow, and wherein generating the set of pre-computed images is in accordance with a received red, green, and blue color profile.

12. The method of claim 10 wherein the plurality of renderings includes interpolated image data and associated color separation data.

13. The system of claim 10 wherein the interpolated image data is displayed to the user to aid in selecting the black replacement parameter.

14. The method of claim 9 wherein the set of pre-computed images are generated prior to any user interaction.

* * * * *